United States Patent Office 3,131,998
Patented May 5, 1964

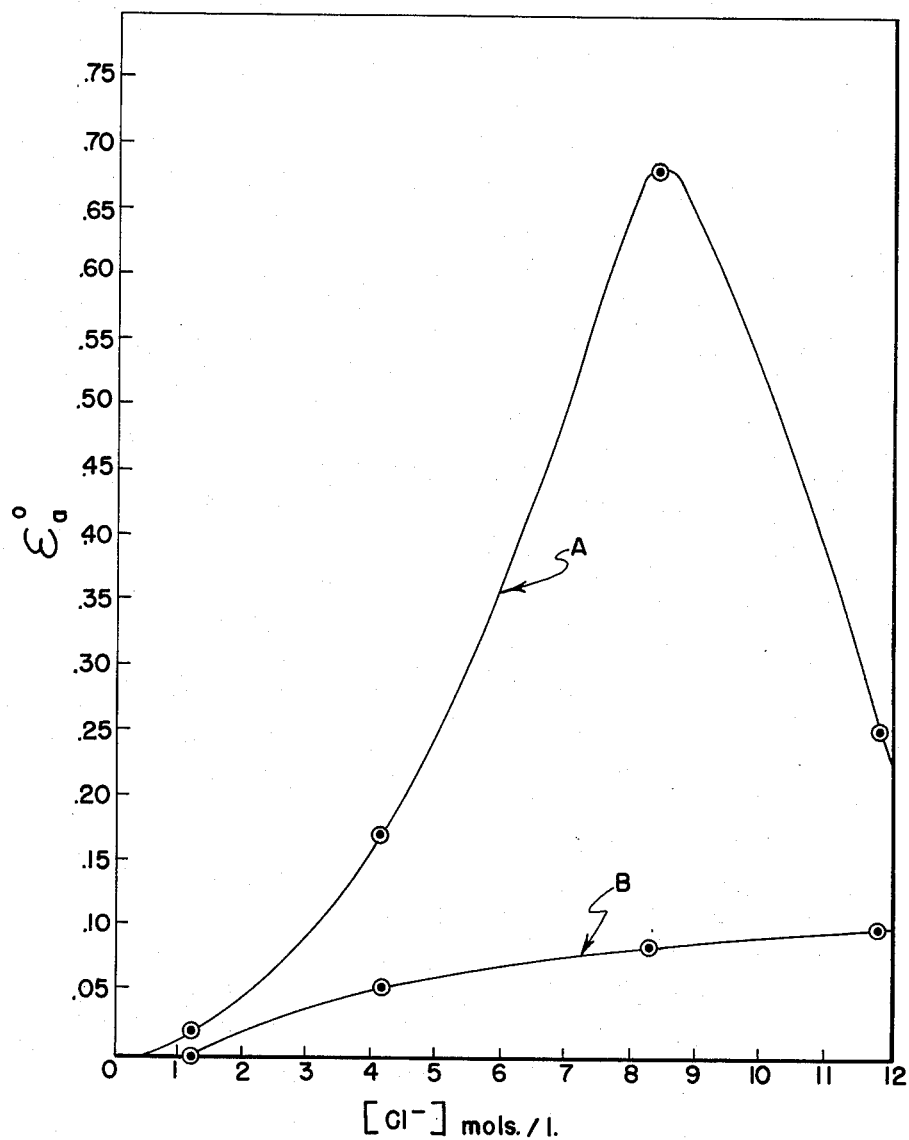

3,131,998
LIQUID-LIQUID EXTRACTION RECOVERY OF COBALT VALUES USING A QUATERNARY AMMONIUM EXTRACTANT
Ronald R. Swanson, Minneapolis, Minn., assignor to General Mills, Inc., a corporation of Delaware
Filed Feb. 15, 1962, Ser. No. 173,515
12 Claims. (Cl. 23—87)

The present invention relates to the recovery of cobalt values from aqueous solutions, and in particular, to the recovery of such values using a liquid-liquid extraction process employing quaternary ammonium compounds. Additionally, it relates to the separation of cobalt values from nickel and other metal values by the use of said extraction process.

Cobalt containing aqueous solutions are encountered in a variety of industrial processes. One of the most common of these processes is the recovery of cobalt from its ores from acid leach systems. Generally, such ores and leach systems also contain other metal values—i.e., copper, ferric iron and nickel. The recovery of cobalt from the leach system by one known method requires several steps. Thus, the acid liquor or feed solution is treated with hydrogen sulfide and filtered. The hydrogen sulfide serves the dual purpose of precipitating copper sulfide and reducing ferric iron to the nonextractable ferrous state. In the second step, cobalt and nickel are extracted as cations from the feed solution with a suitable cation exchange system such as with a substituted aromatic sulfonic acid (dinonylnaphthalene sulfonic acid) in a solvent (kerosene). The cobalt and nickel values are then stripped from the cation exchange system with a strong (6 M) hydrochloric acid solution and the dinonylnaphthalene sulfonic acid is simultaneously regenerated for recycle. The cobalt and nickel concentrations in the strip are about 5 g./l. of each or about twice the concentration in the solvent.

The cobalt is then extracted from the hydrochloric acid stripping medium by an anion exchange system comprising an alkylamine, preferably a tertiary amine, and a suitable solvent such as toluene or kerosene modified with tributyl phosphate. Without the latter modifier, kerosene gives a three-phase system due to the insolubility of the amine hydrochloride. This separation depends on the ability of cobalt (II) to complex with chloride ions to form the complex tetrachlorocobaltate (II) anion:

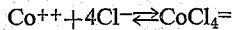

In aqueous solution nickel (II) will not form the analogous tetrachloronickelate (II) anion. The cobalt (II) cations are thus extracted according to the following equation:

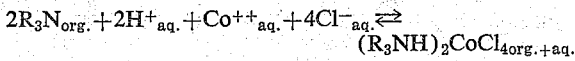

The nickel (II) cations are accordingly left behind in the original aqueous solution. The cobalt is stripped from the organic phase by contacting it with water which, since the chloride concentration is low, causes hydrolysis of the anion into cationic cobalt and chloride ions. The cobalt and nickel can then be recovered from the respective solutions by known techniques—i.e., electrolysis, precipitation by base and the like.

The above anionic extraction using the tertiary amine extractant has several limitations. Thus, a minimum of 4 M hydrochloric acid is required and a concentration of 7–11 M, most preferably 9 M, gives optimum results. Since the amines must be protonated to act as anion exchangers, the use of acidic solutions is mandatory and the use of neutral mediums is precluded. Also, the equipment must be both acid resistant and chloride resistant.

Further, some of the amines proposed for use in this system are fairly toxic and thus special care must be taken in the handling thereof. Finally, the cobalt extraction coefficient of the amine is not exceptionally high.

It has now been discovered that certain quaternary ammonium compounds can be advantageously employed to extract cobalt values from aqueous chloride solutions which can be either neutral or acidic and which may also contain nickel values. This invention is applicable to any cobalt containing aqueous solutions encountered in any process. However, it is particularly applicable to recovery of cobalt values from leach solutions obtained from cobalt containing ores. The quaternary ammonium compounds have an unexpectedly higher extraction coefficient than the amines used heretofore in cobalt extraction processes. Also, the extractants of my invention are less toxic than the amines and can be used to extract cobalt from both acidic and neutral solutions.

It is accordingly one object of the present invention to provide a novel method for extraction of cobalt values from aqueous solutions.

Another object of the invention is to provide an improved method for recovering cobalt values from aqueous solutions containing both cobalt and nickel values.

It is also an object of this invention to provide such processes for the recovery from neutral and acidic solutions.

Other objects of my invention will become apparent from the following detailed description and the claims appended thereto.

Briefly, the process comprises contacting a cobalt or cobalt and nickel containing aqueous solution with a water immiscible organic phase containing the quaternary ammonium compound whereby the cobalt values are preferentially extracted into the organic phase. The aqueous solution must contain sufficient chloride ions to form the extractable complex tetrachlorocobaltate (II) anion, $CoCl_4^=$. Said chloride ions can be supplied by making the aqueous solution acidic with HCl or by adding a suitable salt such as sodium chloride. The loaded organic phase is separated from the aqueous solution by virtue of their immiscibility. The cobalt values are stripped from the loaded organic phase by contacting it with water which, since the chloride concentration is low, causes hydrolysis of the $CoCl_4^=$ into cationic cobalt and chloride ions. The cobalt is then recovered by conventional means.

The aqueous solutions, the starting point of the present process, are either acid or neutral as previously indicated. They may be obtained from any of a wide variety of industrial processes. The present process is particularly useful for recovering cobalt from leach systems of cobalt containing ores. These may be acid, ammonia or other leach systems. Common acids used in leaching are sulfuric and hydrochloric. According to one known procedure, the acid liquor or feed solution is treated with hydrogen sulfide to precipitate copper sulfide and to reduce ferric iron to the non-extractable ferrous state. After the hydrogen sulfide treatment, the solution is treated with a cationic exchange agent such as dinonylnaphthalene sulfonic acid in toluene which extracts cobalt and nickel values into the organic phase. This phase is then stripped with a hydrochloric acid solution, the molarity of which may be as low as about 1 but can be as high as about 9 whereby the cobalt and nickel values are preferentially extracted into the aqueous phase. This latter solution can then serve as the starting solution for the present process. The chloride concentration thereof can be adjusted by adding hydrochloric acid or sodium chloride for example. However, the acid leach systems may be treated by other procedures to arrive at the starting solutions and in some cases they may be extracted directly by the present process, i.e., such as when hydrochloric acid is used as the leaching agent.

The cobalt containing ores may also be pressure leached with ammonia to dissolve cobalt, nickel, copper and the like. Hydrogen sulfide or sulfur can then be added to precipitate copper and leave a solution containing nickel and cobalt. This solution could be treated directly with hydrochloric acid to form the starting solution of the present process. Or the solution could be further treated with hydrogen sulfide to form the nickel and cobalt sulfides. The sulfides could then be oxidized to sulfates and an appropriate amount of chloride ions added to form the starting solution.

It is to be understood that the above procedures are only representative of a large number which can be used to obtain the starting aqueous solutions of the present process.

The quaternary compounds which may be employed in this invention can be defined by the following general formula:

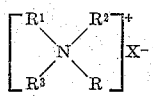

where R is selected from the group consisting of lower alkyl radicals having 1 to 4 carbon atoms, the benzyl radical, and aliphatic hydrocarbon substituted benzyl radicals wherein the aliphatic substituents contain from 1 to about 22 carbon atoms, $R^1$ and $R^2$ are long chain aliphatic hydrocarbon radicals having 8 to 22 carbon atoms, $R^3$ is an aliphatic hydrocarbon radical having 1 to 22 carbon atoms and X is an anion. A suitable substituted benzyl radical is dodecylbenzyl. The long chain aliphatic hydrocarbon radicals may be alike or different, straight or branched chain, and saturated or unsaturated. As a general matter, these fatty groups are derived from mixtures of fatty acids obtained from fatty oils so that the groups will generally be of varying lengths. These mixed acids may be obtained from various animal and vegetable oils. The fatty groups may also be derived from pure fatty acids obtained from such oils or by other methods. Furthermore, said groups may be derived from materials other than fatty acids such as from petroleum sources, from olefin polymers (i.e., tetrapropylene, triisobutylene and the like), from "Oxo" products (i.e., isooctyl) and from Claisen condensation products (i.e., 2-ethylhexyl). Although all of the quaternary ammonium compounds defined by the above formula can be used as the extractants in my process, it is preferred to use those in which $R^1$, $R^2$, and $R^3$ are the same or different aliphatic hydrocarbon radicals having from 8 to 18 carbon atoms and R is a lower alkyl radical having from 1 to 4 carbon atoms (i.e., methyl, butyl). The compounds may be prepared in any of the well-known and conventional manners of forming quaternary ammonium compounds. For purposes of convenience, only one of these fatty compounds was used in the examples to follow. The quaternary used was one in which the fatty groups were mixed and had 8 and 10 carbon atom chains, in that the material was prepared from the $C_8$–$C_{10}$ fraction of fatty acids derived from coconut oil.

In general, any anion may be used for the quaternary ammonium compound. The chloride is the anion most commonly present in commercially available quaternary ammonium compounds and is the preferred anion. Other anions, such as sulfate, bisulfate and nitrate, could be used. However, since the aqueous solution must contain chloride anions, the other salts would be converted to the chloride. Thus, no particular advantage is seen in the use of salts other than the readily available quaternary ammonium chlorides.

In addition to the quaternary ammonium compound, the organic phase generally includes other materials, such as a conditioner, which typically is a long chain aliphatic alcohol, such as capryl alcohol, isodecanol, tridecyl alcohol or 2-ethyl hexanol, or a high molecular weight phenol such as dodecylphenol, and a diluent. Suitable diluents are aliphatic hydrocarbons, aromatic solvents, aromatic petroleum fractions, ketones, nitrohydrocarbons, chlorinated solvents and esters. Examples of these solvents are: benzene, toluene, xylene, Skellysolve B, chloroform and kerosene. The composition of the organic phase is not critical. It is only necessary that the quaternary ammonium compound be present in an amount sufficient to extract the cobalt values from the aqueous solutions. Generally, the extractant will be present in an amount from about 2 to about 50% by weight based on the total organic phase. It is, however, generally preferred that the organic phase consist of from 5 to 15 weight percent quaternary ammonium compound, 2 to 10 weight percent conditioner, and the remainder being the diluent.

The liquid-liquid extraction process of the present invention can be carried out in a continuous counter-current mixer-settler unit. The number of stages can be varied as desired, depending on the efficiency of extraction and stripping. By adjustment of the relative volumes of aqueous metal pregnant solution, organic phase, and water stripping solution introduced to the liquid-liquid extraction apparatus, it is possible to achieve a high degree of metal concentration.

The invention is further described by the following examples. The examples are illustrative only and do not constitute limitations on the invention.

EXAMPLE I

Aqueous feed solutions were prepared which had the following analyses:

| Solution | M Co++ | M Cl- (as HCl) |
|---|---|---|
| 1 | 0.107 | 1.237 |
| 2 | 0.107 | 4.216 |
| 3 | 0.106 | 8.391 |
| 4 | 0.104 | 11.89 |

Each of these solutions was extracted with a solvent which consisted of 50 grams (0.101 N) of a trifatty monomethyl ammonium chloride, the fatty group being derived from coconut oil and having 8 and 10 carbon atoms and 1 liter of chloroform. The extraction operations were performed on a single stage batch basis in separatory funnels at ambient temperature. The organic solvent was first added to the funnels followed by addition of the aqueous feed, the organic:aqueous volume phase ratio for each extraction being 1:1. The separatory funnels were shaken to equilibrate the mixtures and then the phases were allowed to separate.

The results are set forth in the following Table I, which illustrates that maximum loading in the presence of HCl is obtained at a Cl⁻ concentration of 8.391 M and that relatively low loading is obtained at a Cl⁻ concentration of 1.237.

Table I

| Solution | Raffinate Analysis M Co++ | Loaded Organic Analysis M Co++ | $E_a^0$ [1] |
|---|---|---|---|
| 1 | 0.105 | 0.002 | 0.019 |
| 2 | 0.092 | 0.016 | 0.17 |
| 3 | 0.063 | 0.043 | 0.68 |
| 4 | 0.083 | 0.021 | 0.25 |

[1] The extraction coefficient is a measure of the extraction power for cobalt and is defined as the ratio of the concentration of cobalt (II) in the loaded organic phase to the concentration of cobalt (II) in the aqueous raffinate at equilibrium:

$$E_a^0 = \frac{[Co^{++}] \text{ organic}}{[Co^{++}] \text{ aqueous}}$$

EXAMPLE II

The aqueous feed solutions of Example I were also extracted by the same procedure as set forth therein with a 0.0978 N solution of a tertiary alkyl amine in which the alkyl groups were straight chain hydrocarbon groups containing principally 8 and 10 carbon atoms with a minimum amount of 12 carbon atom alkyl groups (the alkyl groups were derived from the mixed $C_8$, $C_{10}$, and $C_{12}$ acids of coconut oil) in chloroform. The results are set forth in Table II.

*Table II*

| Solution | Raffinate Analysis M $Co^{++}$ | Loaded Organic Analysis M $Co^{++}$ | $E_a^0$ |
|---|---|---|---|
| 1 | 0.107 | 0.000 | 0 |
| 2 | 0.103 | 0.005 | 0.049 |
| 3 | 0.098 | 0.008 | 0.082 |
| 4 | 0.095 | 0.009 | 0.095 |

The data of Tables I and II show that the quaternary ammonium chloride has a much higher cobalt extraction coefficient than the comparable conventional tertiary amine. The results for Examples I and II are shown graphically in the drawing, as curves A and B, respectively.

EXAMPLES III AND IV

Aqueous feed solutions were prepared which had the following analyses:

| Solution | M $Co^{++}$ | M $Cl^-$ (as NaCl) |
|---|---|---|
| A | 0.1041 | 3.0 |
| B | 0.0997 | 4.1 |
| C | 0.1063 | 4.6 |

The pH of the above solutions was held constant by addition of $H_2SO_4$ (1 M).

A portion of each of these solutions was then extracted with the following solvents:

Example III—100 grams of the quaternary of Exp. 1. 50 grams of isodecanol. 1 liter kerosene.

Example IV—100 grams of the amine of Exp. II. 50 grams of isodecanol. 1 liter of kerosene.

The extraction operations were performed using the same organic:aqueous volume phase ratio and procedure of Example I. The results are summarized in the following Table III.

*Table III*

| Solution | Organic Solvent | Raffinate Analysis M $Co^{++}$ | Loaded Organic Analysis M $Co^{++}$ | $E_a^0$ |
|---|---|---|---|---|
| A | Ex. III | 0.0975 | 0.0066 | 0.068 |
| B | Ex. III | 0.0574 | 0.0423 | 0.74 |
| C | Ex. III | 0.0486 | 0.0577 | 1.19 |
| A | Ex. IV | 0.1001 | 0.004 | 0.04 |
| B | Ex. IV | 0.0853 | 0.0144 | 0.17 |
| C | Ex. IV | 0.085 | 0.0213 | 0.25 |

As can be readily seen from the above data, the quaternary ammonium chloride extractant (Exp. III) is greatly superior to the tertiary amine extractant (Exp. IV) by this direct comparison.

EXAMPLE V

As can be readily seen from the above data, the quaterfollowing analysis: 0.1085 M $Co^{++}$ and 5.316 M $Cl^-$ as NaCl. The solution was not acidified. The organic solvent of Example I was used as the extractant and the same ratios and extraction procedures as set forth in said example were used. In this example, the aqueous raffinate analyzed 0.0984 M $Co^{++}$ and the loaded organic analyzed 0.0101 M $Co^{++}$. The extraction coefficient ($E_a^0$) was, therefore, 0.112 which demonstrates that the quaternary ammonium chloride adequately extracts cobalt from neutral solutions.

EXAMPLE VI

Aqueous feed solutions were prepared which had the following analyses:

| Solution | M $Co^{++}$ | M $Cl^-$ (as HCl) |
|---|---|---|
| 1 | 0.103 | 6.21 |
| 2 | 0.105 | 7.90 |
| 3 | 0.100 | 9.11 |
| 4 | 0.101 | 10.3 |
| 5 | 0.104 | 11.5 |

Each of these solutions was extracted with a solvent which consisted of 100 grams of the quaternary ammonium chloride of Example I, 70 grams of isodecanol and 1 liter of kerosene. The extraction operations were performed in the same manner as Example I using the same organic:aqueous ratio. The results of this extraction are set forth in Table IV.

*Table IV*

| Solution | Raffinate Analysis M $Co^{++}$ | Loaded Organic Analysis M $Co^{++}$ | $E_a^0$ |
|---|---|---|---|
| 1 | 0.0526 | 0.0484 | 0.92 |
| 2 | 0.0370 | 0.0654 | 1.77 |
| 3 | 0.0319 | 0.0655 | 2.05 |
| 4 | 0.0359 | 0.0626 | 1.74 |
| 5 | 0.0427 | 0.0589 | 1.37 |

The data further demonstrates the outstanding ability of the quaternary ammonium compound in cobalt (II) extractions from acidic solutions.

Example VII

An aqueous feed solution was prepared which had the following analysis: 0.104 M $Co^{++}$ and 4.21 M $Cl^-$ (from NaCl). Said solution was divided into several portions and the pH of each was adjusted by adding $H_2SO_4$. The resulting solutions were extracted in the same manner and with the same extractant as set forth in Example VI. The results are set forth in the following Table V.

*Table V*

| Solution | pH | Raffinate Analysis M $Co^{++}$ | Loaded Organic Analysis M $Co^{++}$ | $E_a^0$ |
|---|---|---|---|---|
| 1 | 5.75 | 0.064 | 0.04 | 0.62 |
| 2 | 1.0 | 0.073 | 0.031 | 0.42 |
| 3 | 0.5 | 0.066 | 0.038 | 0.58 |
| 4 | 0.2 | 0.069 | 0.035 | 0.51 |

The above data shows that the extractant of the present invention is very effective throughout the entire acidic pH range. The highest extraction coefficient was obtained at the high pH where conventional amine extractants would be ineffective.

As stated previously, the process of the present invention is particularly adapted to the recovery of cobalt values from aqueous solutions derived from cobalt containing ores. However, the process is not limited to such utility but is useful in the recovery of cobalt values from aqueous solutions regardless of their derivation.

It is to be understood that the invention is not to be limited to the exact details of operation or the exact processes shown or described, as obvious modifications and equivalents will be apparent to those skilled in the art and the invention is to be limited only by the scope of the appended claims.

The embodiments of the invention in which an exclusive property or privilege is claimed are defined as follows:

1. A process for the recovery of cobalt values from an aqueous solution, said aqueous solution having a pH of less than about 7.0 and containing sufficient chloride ions to form tetrachlorocobaltate anions with the cobalt values, comprising contacting said aqueous solution with a quaternary ammonium compound having the structural formula:

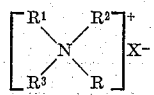

where R is selected from the group consisting of lower alkyl radicals having 1 to 4 carbon atoms, the benzyl radical, and aliphatic hydrocarbon substituted benzyl radicals wherein the aliphatic substituents contain from 1 to about 22 carbon atoms, $R^1$ and $R^2$ are aliphatic hydrocarbon radicals having 8 to 22 carbon atoms, $R^3$ is an aliphatic hydrocarbon radical having 1 to 22 carbon atoms, and X is an anion.

2. A process for the recovery of cobalt values from an aqueous solution, said aqueous solution having a pH of less than about 7.0 and containing sufficient chloride ions to form tetrachlorocobaltate anions with the cobalt values, comprising: (1) contacting the aqueous solution with a liquid organic phase containing a quaternary ammonium compound in an amount sufficient to extract the cobalt values into the organic phase, said quaternary ammonium compound having the structural formula:

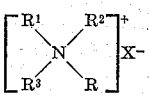

where R is selected from the group consisting of lower alkyl radicals having 1 to 4 carbon atoms, the benzyl radical, and aliphatic hydrocarbon substituted benzyl radicals wherein the aliphatic substituents contain from 1 to about 22 carbon atoms, $R^1$ and $R^2$ are aliphatic hydrocarbon radicals having 8 to 22 carbon atoms, $R^3$ is an aliphatic hydrocarbon radical having 1 to 22 carbon atoms, and X is an anion; (2) separating the resultant cobalt-pregnant organic phase from the aqueous phase; and (3) contacting said cobalt-pregnant organic phase with water to strip the cobalt values from the cobalt-pregnant organic phase.

3. A process as defined in claim 2 in which said aqueous solution has an acid pH.

4. A process as defined in claim 2 in which said aqueous solution is essentially neutral.

5. A process as defined in claim 2 in which said aqueous solution also contains nickel values.

6. A process as defined in claim 2 in which $R^1$, $R^2$, and $R^3$ are aliphatic hydrocarbon radicals of 8 to 18 carbon atoms.

7. A process as defined in claim 6 in which R is a lower alkyl radical having 1 to 4 carbon atoms.

8. A process as defined in claim 7 in which X is Cl.

9. A process as defined in claim 8 in which $R^1$, $R^2$, and $R^3$ are aliphatic hydrocarbon radicals having 8 to 10 carbon atoms and R is methyl.

10. A process as defined in claim 2 wherein the aqueous solution is derived from an acid leach liquor obtained from cobalt containing ores.

11. A process as defined in claim 2 wherein the aqueous solution is derived from an ammonia leach liquor obtained from cobalt containing ores.

12. In the process of recovering cobalt from an acid leach liquor obtained from cobalt containing ores wherein (1) the leach liquor is treated with hydrogen sulfide to precipitate copper sulfide and reduce ferric iron to the nonextractable ferrous state, (2) the hydrogen sulfide treated solution is contacted with a cation exchange system to extract cobalt and nickel values therefrom, (3) the cobalt and nickel values are stripped from the cation exchange system with a strong hydrochloric acid solution, (4) the cobalt and nickel containing hydrochloric acid solution is contacted with a liquid anion exchange system to extract the cobalt values therefrom, and (5) the cobalt values are stripped from the liquid anion exchange system with water, the improvement comprising using as the liquid anion exchange system, an organic phase containing a quaternary ammonium compound having the structural formula:

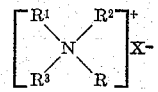

where R is selected from the group consisting of lower alkyl radicals having 1 to 4 carbon atoms, the benzyl radical, and aliphatic hydrocarbon substituted benzyl radicals wherein the aliphatic substituents contain from 1 to about 22 carbon atoms, $R^1$ and $R^2$ are aliphatic hydrocarbon radicals having 8 to 22 carbon atoms, $R^3$ is an aliphatic hydrocarbon radical having 1 to 22 carbon atoms, and X is an anion.

References Cited in the file of this patent

UNITED STATES PATENTS

| | | |
|---|---|---|
| 2,840,451 | Katzin et al. | June 24, 1958 |
| 2,877,250 | Brown et al. | Mar. 10, 1959 |

OTHER REFERENCES

Coleman et al.: Proceedings of International Conference on Peaceful Uses of Atomic Energy, vol. 28, pages 278–287 (1958).

Moore: Analytical Chemistry, vol. 29, pages 1660–1662 (November 1957).

UNITED STATES PATENT OFFICE
CERTIFICATE OF CORRECTION

Patent No. 3,131,998            May 5, 1964

Ronald R. Swanson

It is hereby certified that error appears in the above numbered patent requiring correction and that the said Letters Patent should read as corrected below.

Column 5, line 69, for "As can be readily seen from the above data, the quater-" read -- An aqueous feed solution was prepared which had the --.

Signed and sealed this 8th day of September 1964.

(SEAL)
Attest:

ERNEST W. SWIDER
Attesting Officer

EDWARD J. BRENNER
Commissioner of Patents